United States Patent
Huang et al.

(10) Patent No.: US 8,397,409 B2
(45) Date of Patent: Mar. 19, 2013

(54) COMPUTER SYSTEM, METHOD AND SYSTEM FOR CONTROLLING LIGHT

(75) Inventors: Pai-Ching Huang, Taipei (TW);
Chan-Hsuan Kao, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 794 days.

(21) Appl. No.: 12/481,580

(22) Filed: Jun. 10, 2009

(65) Prior Publication Data
US 2010/0039275 A1 Feb. 18, 2010

(30) Foreign Application Priority Data
Aug. 15, 2008 (TW) .............................. 97131232 A

(51) Int. Cl.
*G08B 21/00* (2006.01)
(52) U.S. Cl. .......................... 40/635; 340/679
(58) Field of Classification Search .................. None
See application file for complete search history.

(56) References Cited

U.S. PATENT DOCUMENTS

| | | | |
|---|---|---|---|
| 6,285,911 B1 * | 9/2001 | Watts et al. ........................ 700/2 |
| 7,027,808 B2 * | 4/2006 | Wesby ........................... 455/419 |
| 8,154,417 B2 * | 4/2012 | Hauenstein et al. ........... 340/683 |
| 2003/0058097 A1 * | 3/2003 | Saltzstein et al. .............. 340/531 |
| 2005/0040964 A1 * | 2/2005 | Thomas ..................... 340/815.45 |
| 2005/0222933 A1 * | 10/2005 | Wesby ............................. 705/36 |
| 2006/0033730 A1 * | 2/2006 | Wu ................................ 345/211 |
| 2007/0038742 A1 | 2/2007 | Lin |
| 2008/0094246 A1 * | 4/2008 | Yuan ........................ 340/825.22 |
| 2009/0325686 A1 * | 12/2009 | Davis et al. ..................... 463/25 |

FOREIGN PATENT DOCUMENTS

| | | |
|---|---|---|
| CN | 1431593 | 7/2003 |
| TW | 464009 | 11/2001 |
| TW | M291039 | 5/2006 |
| TW | I259599 | 8/2006 |
| TW | I299156 | 7/2008 |

OTHER PUBLICATIONS

"First Office Action of China Counterpart Application," issued on Sep. 6, 2010, p. 1-4, in which the listed reference was cited.

* cited by examiner

*Primary Examiner* — Julie Lieu
(74) *Attorney, Agent, or Firm* — Jianq Chyun IP Office

(57) ABSTRACT

A method for controlling a light is provided. The method is suitable for a computer system. The method includes interrupting an original service of the light and obtaining the authority to control the light. The method also includes controlling the operation of the light according to a current status of the computer system.

11 Claims, 6 Drawing Sheets

COMPUTER SYSTEM, METHOD AND SYSTEM FOR CONTROLLING LIGHT

CROSS-REFERENCE TO RELATED APPLICATION

This application claims the priority benefit of Taiwan application serial no. 97131232, filed on Aug. 15, 2008. The entirety of the above-mentioned patent application is hereby incorporated by reference herein and made a part of specification.

BACKGROUND OF THE INVENTION

1. Field of the Invention

The present invention generally relates to a method for controlling a light, and more particularly, to a method for controlling a light which indicates the current status of a computer system.

2. Description of Related Art

A computer system includes a central processing unit (CPU), a chipset, and a basic input/output system (BIOS) unit. The CPU is coupled to the BIOS unit and other hardware devices (for example, a memory, a graphic card, and a hard disk, etc) through the chipset. Besides, the computer system further includes a power supply which supplies an operating power to the computer system.

The power supply starts to supply the operating power to a computer system when the computer system is powered on. Then, the BIOS stored in the BIOS unit starts to perform a power-on self-test (POST) process. The purpose of the POST is to test whether some key devices in the computer system (for example, a memory, a graphic card, and a hard disk, etc) can operate normally. Generally speaking, if an error is detected during the POST (for example, no memory is found or the memory is faulty), the error cannot be displayed in the display. In order to allow a user to understand which part of the computer system is faulty, conventionally, if a hardware error is detected during the POST, a sound is played by a built-in speaker of the computer system so that the user can get to know which part of the computer system is faulty based on the length and number of the sound played by the speaker.

However, the method described above has some disadvantages. For example, it is very inconvenient to play a sound in a quiet environment (for example, in an office). Even in a general environment, it is not a comfortable way to notify a user of a hardware error. Besides, the capability of human's audition to identify the length of a sound is not very reliable. Moreover, in the conventional technique, only one sound is played through the speaker when an error is detected during a POST, and if the user does not catch the sound clearly, the user cannot determine the error correctly.

SUMMARY OF THE INVENTION

Accordingly, the present invention is directed to a method for controlling a light, wherein the current status of a computer system is displayed by using an original light of the computer system so that the hardware cost of the computer system is not increased.

The present invention is directed to a system for controlling a light, wherein the system can display the current status of a computer system.

The present invention is further directed to a computer system which can display its current state through a light.

The present invention provides a method for controlling a light. The method is suitable for a computer system. The method includes interrupting an original service of the light and obtaining an authority to control the light. The method also includes controlling the operation of the light according to a current status of the computer system.

The present invention provides a system for controlling a light. The system is suitable for a computer system. The system includes a start-up module, a detection module, and an alarm module. The start-up module determines whether to interrupt an original service of the light and obtain an authority to control the light through a controller according to an external operation. The detection module detects a status of the computer system and generates a detection result after the start-up module obtains the authority to control the light. The alarm module controls the operation of the light through the controller according to the detection result.

According to an embodiment of the present invention, the detection module detects the status of each hardware device in the computer system and generates the corresponding detection result when the computer system is powered on.

According to another embodiment of the present invention, the detection module detects whether a predetermined event occurs and generates the corresponding detection result when the computer system loads an operating system.

The present invention further provides a computer system including a light circuit, a storage unit, and a controller. The light circuit includes at least one light, and the light circuit is disposed on a case of the computer system. The storage unit has a control program and is coupled to the light circuit through the controller. When the control program is started, the control program interrupts an original service of the light and obtains the authority to control the light through the controller, so as to control the operation of the light through the controller according to the status of the computer system.

Additionally, the computer system in the present invention further includes a hard disk and a power supply.

According to an embodiment of the present invention, the light may be a first light, and the light circuit may further include a hard disk light controller and a first switch module. The first switch module is coupled to the light and the hard disk light controller. The controller determines the status of the first switch module according to whether the control program is started. When the first switch module is enabled, the operation of the first light is controlled by the hard disk light controller according to the status of the hard disk. Contrarily, when the first switch module is disabled, the operation of the first light is controlled by the controller.

In addition, the light may also be a second light, and the light circuit may further include a power supply light controller and a second switch module. Similarly, the second switch module is coupled to the second light and the power supply light controller. The controller determines the status of the second switch module according to whether the control program is started. When the second switch module is enabled, the operation of the second light is controlled by the power supply light controller according to the status of the power supply. When the second switch module is disabled, the operation of the second light is controlled by the controller.

In the present invention, the original service of a light can be interrupted and the operation of the light can then be controlled according to the current status of the computer system. Thereby, the current status of the computer system can be clearly and quickly displayed to a user without increasing the hardware cost of the computer system.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
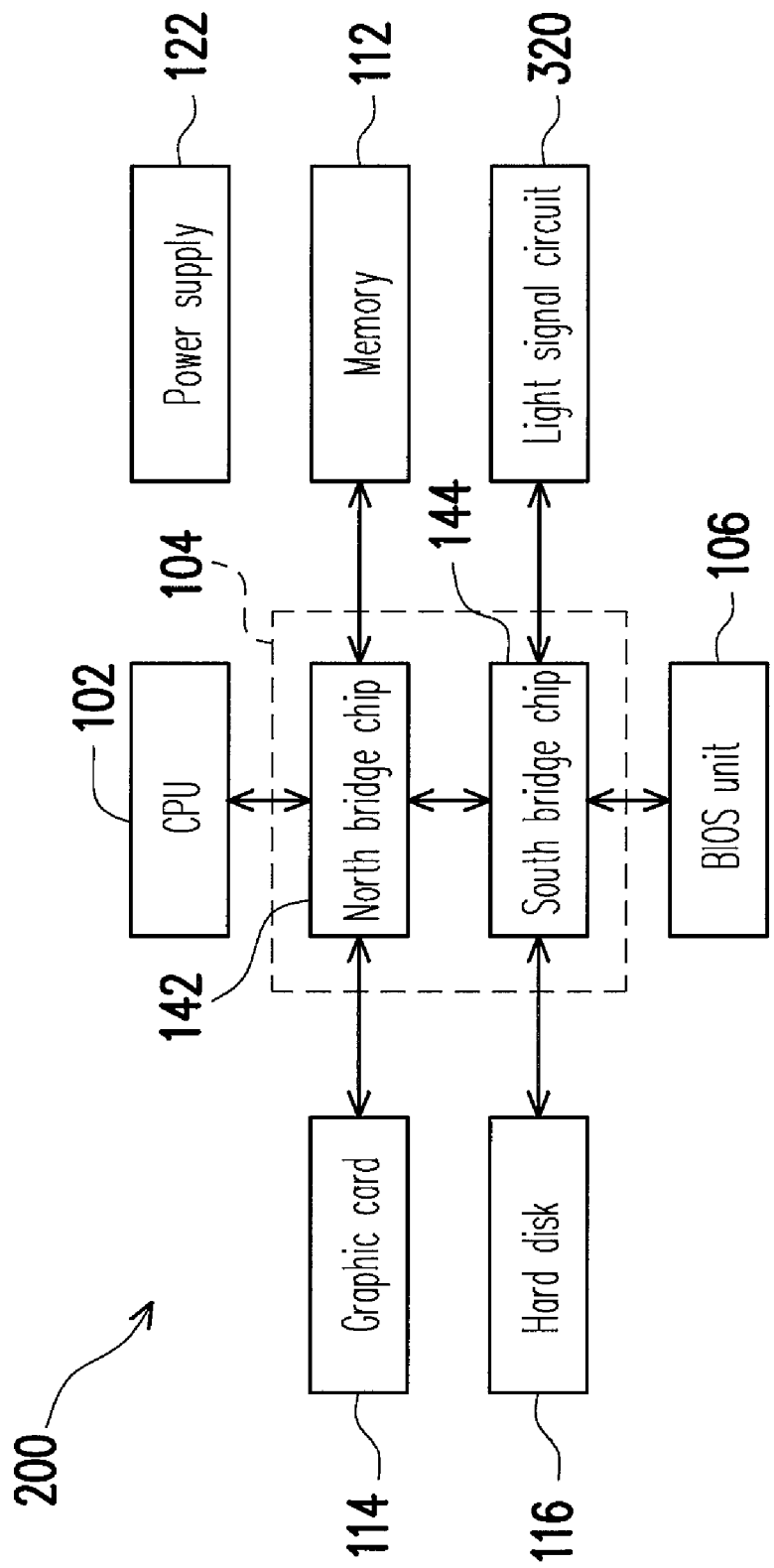
FIG. 1 is a block diagram of a computer system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
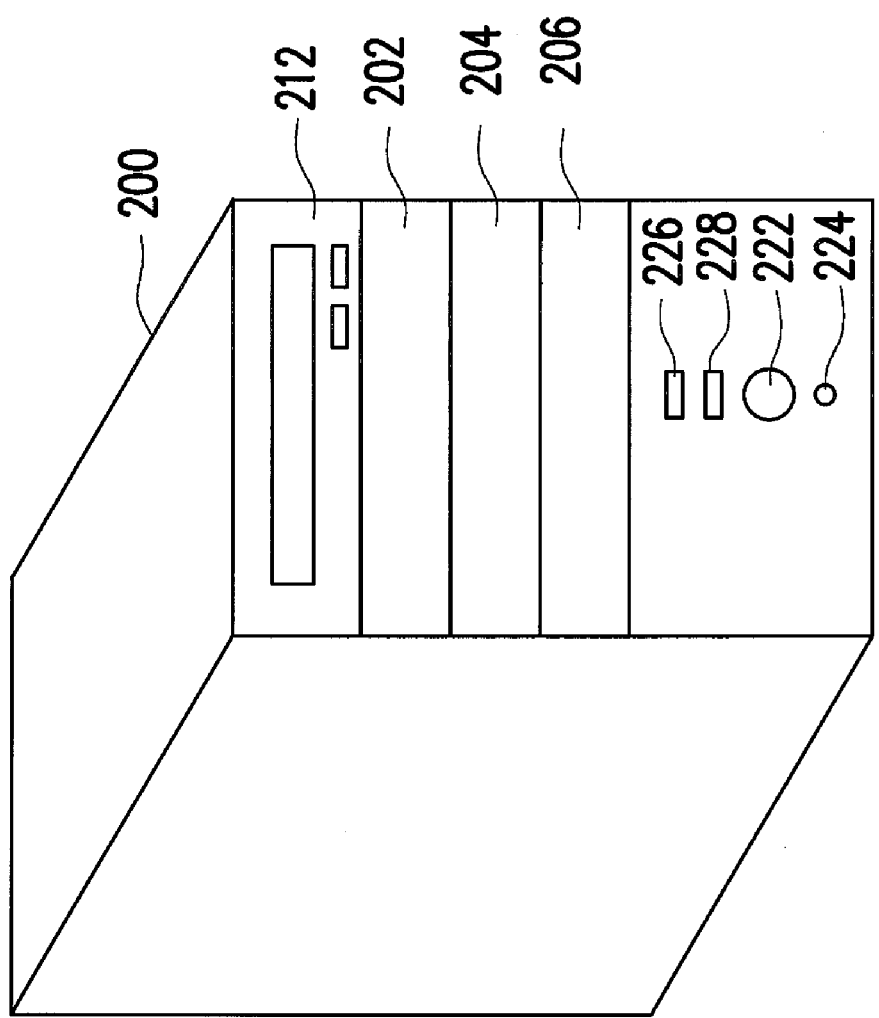
FIG. 2 illustrates the appearance of a computer system according to an embodiment of the present invention.

FIG. 1 is a block diagram of a computer system according to an embodiment of the present invention. FIG. 2 illustrates the appearance of a computer system according to an embodiment of the present invention. Referring to FIG. 1 and FIG. 2, the computer system 200 in the present embodiment may be a desktop computer; however, the present invention is not limited thereto. A plurality of slots 202, 204, and 206 are disposed on the computer system 200, and some electronic devices (for example, a CD-ROM 212) are installed on the computer system 200 through these slots. Besides, a plurality of function buttons, such as the buttons 222 and 224, are further disposed on the case of the computer system 200 wherein the function button 222 is a power button, and the function button 224 is a reset button.

Additionally, a plurality of light, such as light 226 and 228, are further disposed on the case of the computer system 200. The light 226 and 228 are used for indicating the status of some devices in the computer system 200.

In an embodiment of the present invention, the light 226 is used for indicating the status of a power supply 122. For example, the light 226 is lit when the computer system 200 is powered on, and the light 226 flashes when the computer system 200 enters a power-saving mode. The light 228 is used for indicating the status of a hard disk 116. For example, the light 228 flashes when a CPU 102 accesses the hard disk 116.

As described above, the operations of the light 226 and 228 are controlled by a light circuit 320. In the present embodiment, the light circuit 320 is coupled to a chipset 104. Generally speaking, the chipset 104 includes a north bridge chip 142 and a south bridge chip 144, wherein the north bridge chip 142 is coupled to a memory 112 and a graphic card 114, and the south bridge chip 144 is coupled to a basic input/output system (BIOS) unit 106 and the hard disk 116. The BIOS unit 106 may be a flash memory, and a BIOS is built in the BIOS unit 106, wherein the BIOS is loaded into the memory 112 and is executed when the computer system 200 is powered on. The memory 112 is a real-only memory (ROM). Besides, the operating system of the computer system 200 is installed in the hard disk 116. After the BIOS is executed, the CPU 102 loads the operating system from the hard disk 116 into the memory 112 and executes it.

Figure 3:
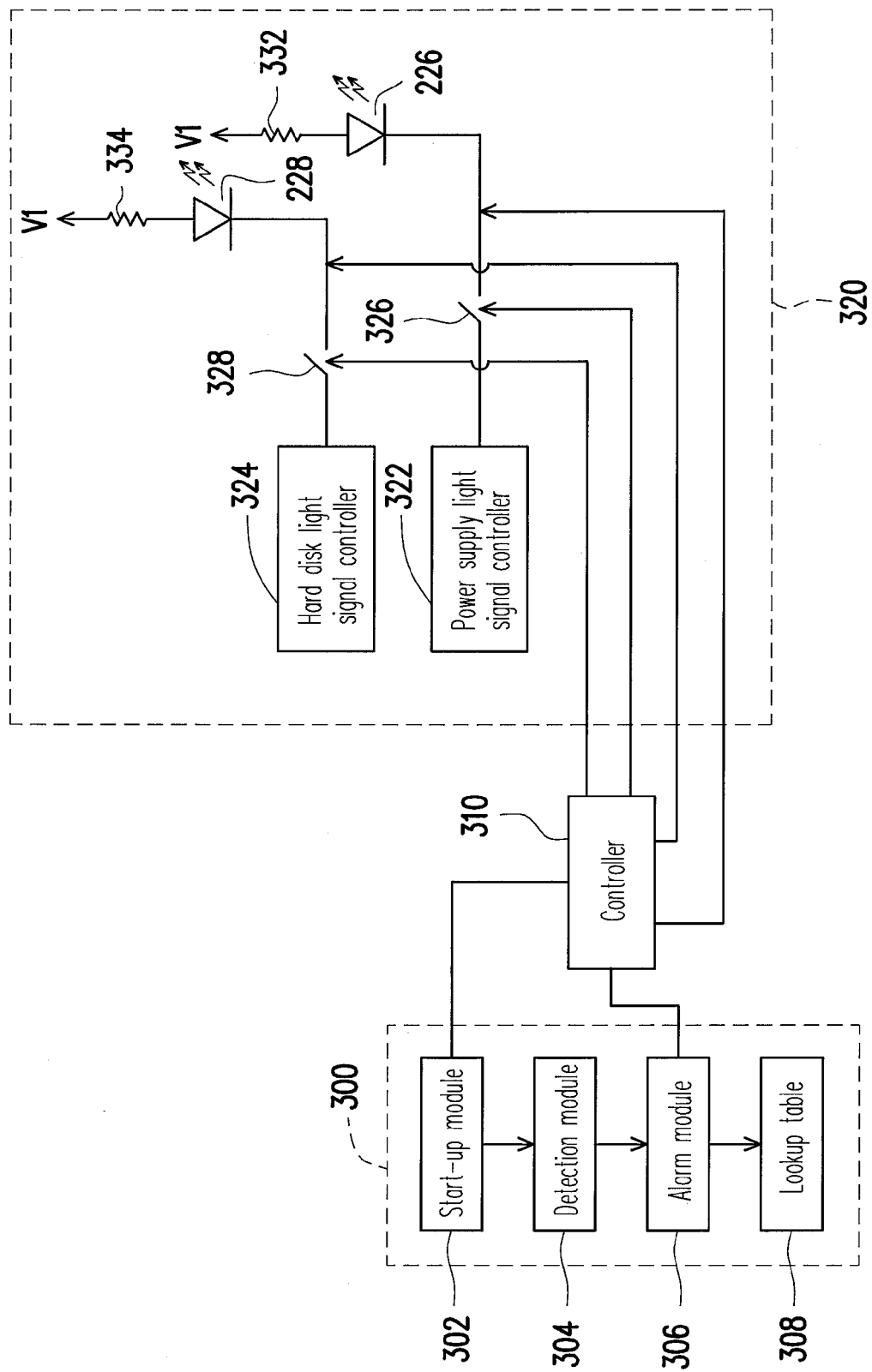
FIG. 3 is a functional block diagram of a system for controlling a light and a light circuit according to an embodiment of the present invention.

FIG. 3 is a functional block diagram of a system for controlling a light and a light circuit according to an embodiment of the present invention. Referring to both FIG. 1 and FIG. 3, in the present embodiment, a system 300, as a program product in some embodiments, is provided and which is installed in a storage unit, such as the BIOS unit 106 or the operating system in the hard disk 116. The system 300 is coupled to a controller 310 and allows the controller 310 to control the light circuit 320. In the present embodiment, the controller 310 may be implemented with the south bridge chip 144 illustrated in FIG. 1.

The system 300 includes a start-up module 302, a detection module 304, and an alarm module 306. The start-up module 302 is coupled to the controller 310 and the detection module 304. The detection module 304 is coupled to the alarm module 306, and the alarm module 306 is also coupled to the controller 310. In another embodiment of the present invention, the alarm module 306 may be further coupled to a lookup table 308.

In addition, the light circuit 320 includes a power supply light controller 322, a hard disk light controller 324, and switch modules 326 and 328. The power supply light controller 322 is coupled to the light 226 through the switch module 326, and the hard disk light controller 324 is coupled to the light 228 through the switch module 328. In the present embodiment, the light 226 and 228 are both implemented by using light emitting diodes (LEDs), wherein the cathodes of the light 226 and 228 are respectively coupled to the switch modules 326 and 328, and the anodes thereof are coupled to a voltage source V1 respectively through resistors 332 and 334.

In the present embodiment, the status of the switch modules 326 and 328 are controlled by the controller 310. The controller 310 enables the switch modules 326 and 328 before the system 300 is started. Then, the power supply light controller 322 controls the operation of the light 226 according to the status of the power supply 122, and the hard disk light controller 324 controls the operation of the light 228 according to the current status of the hard disk 116.

Figure 4:
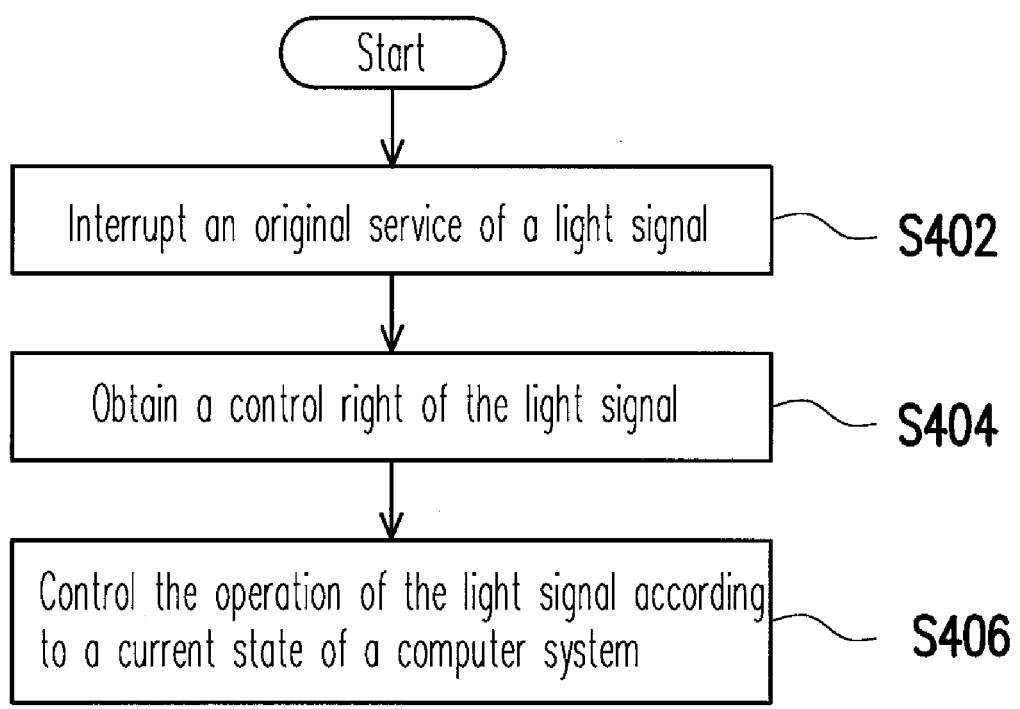
FIG. 4 is a flowchart of a light control method according to an embodiment of the present invention.

FIG. 4 is a flowchart of a light control method according to an embodiment of the present invention. Referring to FIG. 3 and FIG. 4, the start-up module 302 first notifies the controller 310 when the system 300 is started by an external operation. The controller 310 then disables the switch modules 326 and 328 to interrupt the original services of the light 226 and 228 (step S402) and obtain the control rights of the light 226 and 228 (step S404). In addition, the start-up module 302 further calls the detection module 304 so that the detection module 304 starts to detect the current status of the computer system and generates a detection result for the alarm module 306. When the alarm module 306 receives the detection result from the detection module 304, it controls the operations the light 226 and 228 (step S406) through the controller 310.

Figure 5A:
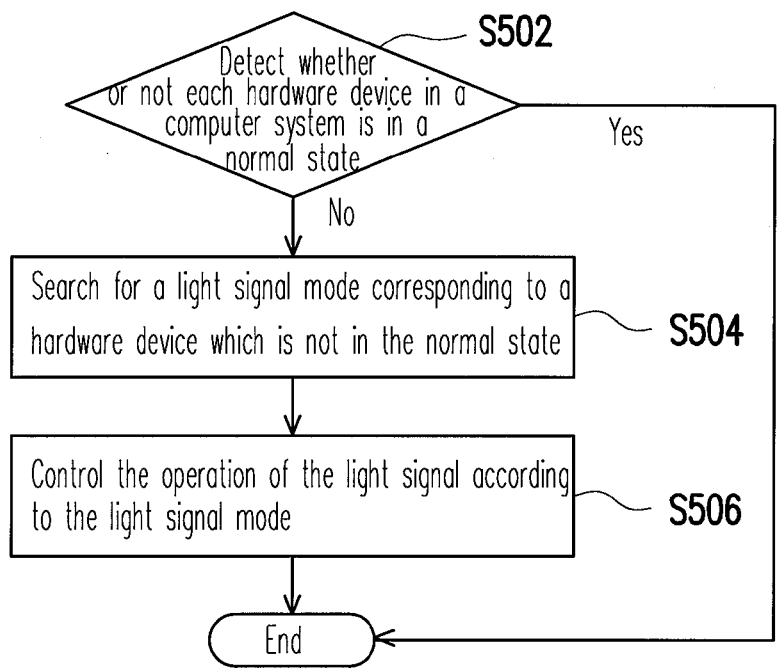
FIG. 5A is a flowchart illustrating how the operation of a light is controlled according to an embodiment of the present invention.

FIG. 5A is a flowchart illustrating how the operation of a light is controlled according to an embodiment of the present invention. Referring to FIG. 3 and FIG. 5A, in the present embodiment, the system 300 is disposed in the BIOS and is started by an external operation. Thus, when the computer system is powered on, the BIOS is executed and a POST is performed. Herein if the system 300 is started, the detection module 304 detects whether the status of each hardware device in the computer system is normal (step S502). The entire procedure is ended if each hardware device is in the normal status (i.e., "yes" in step S502). Contrarily, if the detection module 304 detects that one of the hardware devices is not in the normal status (i.e., "no" in step S502),the detection module 304 sends the detection result to the alarm module 306. Accordingly, in step S504, the alarm module 306 searches for a light mode corresponding to the hardware device in the lookup table 308 and controls the operations of the light 226 and 228 through the controller 310 according to the light mode (step S506).

For example, when the detection module 304 detects during the POST process that the graphic card cannot operate correctly, the alarm module 306 searches for a light mode corresponding to the fact that the graphic card cannot operate normally in the lookup table 308 according to the detection result of the detection module 304. Assuming that the light mode corresponding to the fact that the graphic card cannot operate normally is continuous flashing of the light 226, then the alarm module 306 controls the light 226 to continuously flash through the controller 310. However, the controller 310 may also control the light 226 and 228 to flash alternatively as an alarm. However, the flashing frequency of the light 226 or the alternatively flashing frequency of the light 226 and 228 are not limited in the present invention, and it is within the scope and spirit of the present invention as long as the light is controlled to flash as an alarm.

Figure 5B:
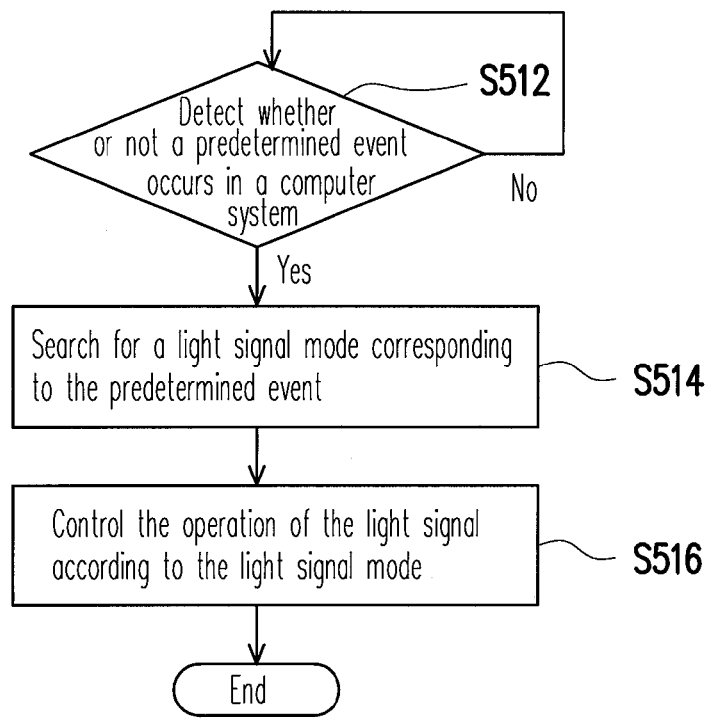
FIG. 5B is a flowchart illustrating how the operation of a light is controlled according to another embodiment of the present invention.

FIG. 5B is a flowchart illustrating how the operation of a light is controlled according to another embodiment of the present invention. Referring to FIG. 3 and FIG. 5B, in another embodiment of the present invention, the system 300 may also be disposed in the operating system. The operating system is loaded after the BIOS is executed. Then, when the system 300 is started, the detection module 304 constantly detects whether a predetermined event occurs (for example, whether a new e-mail is received in the mailbox) in the computer system (step S512).

If the detection module 304 detects that the predetermined event occurs (i.e. "yes" in step S512), the detection module 304 sends the detection result to the alarm module 306. Then, the alarm module 306 searches for a light mode corresponding to the predetermined event in the lookup table 308 (step S514). For example, the light mode corresponding to the fact that a new e-mail is received in the mailbox is alternative flashing of the light 226 and 228. The alarm module 306 then controls the light 226 and 228 to flash alternatively through the controller 310 (step S516). Similarly, it is within the scope and spirit of the present invention as long as whether a predetermined event occurs in a computer system is indicated by flashing a light.

As described above, a user can instantly get to know the current status of a computer system based on different light modes. Moreover, in the present invention, the original light disposed on the case of the computer system is utilized so that the hardware cost of the computer system is not increased.

Figure 6:
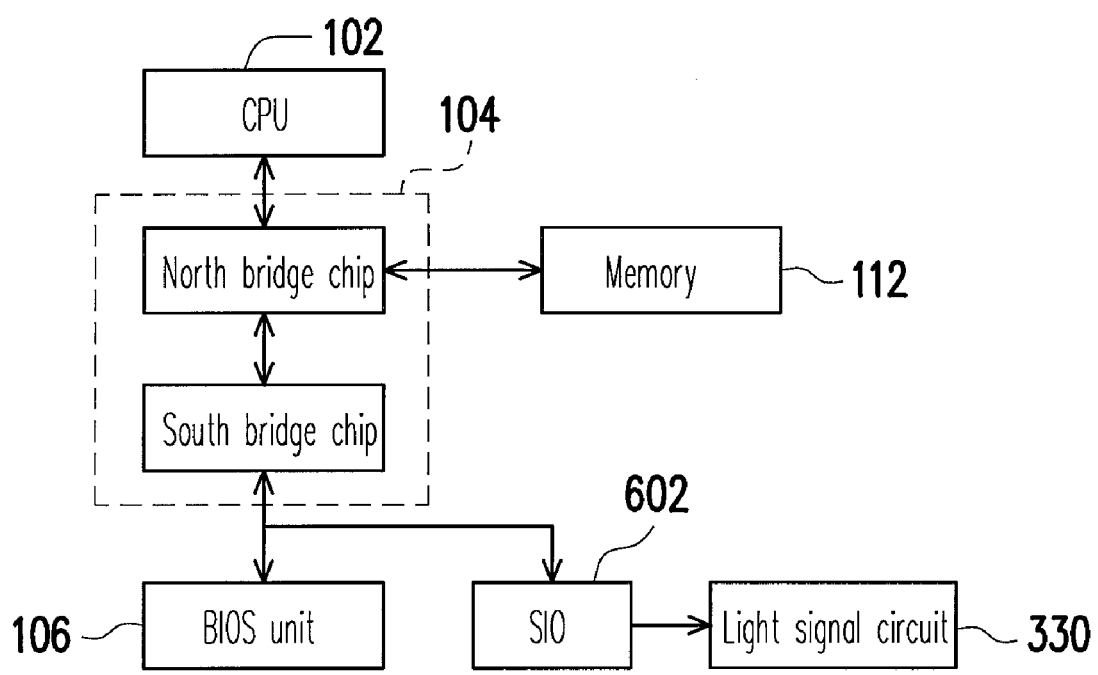
FIG. 6 is a block diagram of a computer system according to another embodiment of the present invention.

Even though the controller is implemented with a south bridge chip in the embodiment described above, the present invention is not limited thereto. FIG. 6 is a block diagram of a computer system according to another embodiment of the present invention. Referring to FIG. 6, in the present embodiment, the light circuit 330 is coupled to an input/output control unit (SIO) 602. In other words, the controller 310 in FIG. 3 is replaced by the SIO 602.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer system, comprising:
a power supply;
a hard disk;
a storage unit, having a control program;
a controller, coupled to the storage unit and the light signal circuit, and when the control program is started, the control program stops an original service of the light signal in a default stares of the computer system and transferring the controlling right of the light signal through the controller, so as to control the light signal through the controller according to a status of the computer system;
a light signal circuit, having a light signal which comprises a first light signal and a second light signal, the light signal circuit being disposed on a case of the computer system; and
wherein the light signal circuit comprises:
a hard disk light signal controller, for controlling the first light signal according to a status of the hard disk;
a first switch module, coupled to the first light signal and the hard disk light signal controller, wherein the controller determines a status of the first switch module according to whether the control program is started, the first light signal is controlled by the hard disk light signal controller when the first switch module is enabled, and the first light signal is controlled by the controller when the first switch module is disabled;
a power supply light signal controller, for controlling the second light signal according to a status of the power supply;
a second switch module, coupled to the second light signal and the power supply light signal controller, wherein the controller determines a status of the second switch module according to whether the control program is started, the second light signal is controlled by the power supply light signal controller when the second switch module is enabled, and the second light signal is controlled by the controller when the second switch module is disabled.

2. The computer system according to claim 1, wherein the storage unit is a basic input/output system (BIOS) unit.

3. The computer system according to claim 1, wherein the storage unit is a memory.

4. The computer system according to claim 1, wherein the controller is a south bridge chip.

5. The computer system according to claim 1, wherein the controller is an input/output control chip.

6. The computer system according to claim 1, wherein the computer system further comprises
a light signal controlling system comprising:
a start-up module, for determining whether to stop an original service of the light signal in a default status of the computer system and transferring the controlling right of the light signal through a controller according to an external operation;
a detection module, for detecting a status of the computer system and generating a detection result after the start-up module transfers the controlling right of the light signal; and
an alarm module, for controlling the light signal through the controller according to the detection result.

7. The computer system according to claim 6, wherein the light signal controlling system further comprises a lookup table, wherein the alarm module searches for a corresponding light signal mode in the lookup table according to the detection result and controls the light signal according to the light signal mode.

8. The computer system according to claim 6, wherein the original service of the light signal is to indicate a status of a hard disk in the computer system.

9. The computer system according to claim 6, wherein the original service of the light signal is to indicate a status of a power supply in the computer system.

10. The computer system according to claim 6, wherein the detection module detects a status of each hardware device in the computer system and generates the corresponding detection result when the computer system is powered on.

11. The computer system according to claim 6, wherein the detection module detects whether a predetermined event occurs and generates the corresponding detection result when the computer system loads an operating system.

* * * * *